United States Patent [19]

Habart

[11] Patent Number: 5,243,860
[45] Date of Patent: Sep. 14, 1993

[54] LIQUID LEVEL MEASUREMENT

[75] Inventor: Phillippe Habart, Calais, France

[73] Assignee: Whessoe plc, Durham, England

[21] Appl. No.: 824,143

[22] Filed: Jan. 22, 1992

[51] Int. Cl.$^5$ .................. G01F 23/00; G01F 23/22
[52] U.S. Cl. ........................... 73/291; 33/715;
33/716; 33/720; 318/642; 374/142
[58] Field of Search .............. 73/321, 149, 290 B;
33/714, 715, 720

[56] References Cited

U.S. PATENT DOCUMENTS

| | | | |
|---|---|---|---|
| 4,061,901 | 12/1977 | Saunders et al. | 73/321 |
| 4,065,968 | 1/1978 | Sunagawa | 73/321 X |
| 4,255,859 | 3/1981 | Klieman | 33/715 |
| 4,942,351 | 7/1990 | Kronan | 318/642 |

OTHER PUBLICATIONS

Enraf Nonius Delft, Specification Sheet 802-1-E, Solid State Reliability with Enraf 802 Series Precise Level Gauges, Nov. 1976.

Whessoe, Jaugeur Asseryi Type 1140, FIG. 1140 Servo Gauge, The Highest Degree of Accuracy in Level Measurement.

Enraf Nonius, Series 854 Advanced Technology Gauge, The Inventory Gauging System for the 90s.

Primary Examiner—Daniel M. Yasich
Attorney, Agent, or Firm—Cushman, Darby & Cushman

[57] ABSTRACT

The invention relates to apparatus (1) for monitoring the level of a liquid within a vessel (3). The apparatus comprises a surface following sensing head (5) adapted to follow the surface (7) of the liquid. A gauging head (9) is mounted outside the vessel (3) at pre-determined fixed distance from the vessel (3). Rotatably mounted within the gauge head (9) is a reel (11) which has wound upon it a flexible elongate tape (13) having its free end (15) connected to the sensing head (5). The flexible tape (13) passes along a defined path of fixed length from the reel (11) to a reference point above the vessel and includes a plurality of level markers (17) which are equally spaced one from another along the length of the tape (13) each pair of adjacent markers (17) being of pre-determined fixed distance apart. A stepper motor (19) is mounted within the gauging head (9) and coupled to the reel (11) to rotate the reel (11) about its axis in two opposite directions. A step counter (21) is coupled to the stepping motor (19) to count the number of steps stepped by the motor (19) in the direction in which the steps are taken. A guide (23) has mounted within it a marker (25) through which the tape (13) passes to detect the presence or absence of the marker (17). A microprocessor (27) is mounted within the gauging head (9) and is coupled to the marker detector (25) and the step counter (21) to calculate and display the exact level of the liquid by calculating the Ullage.

18 Claims, 10 Drawing Sheets

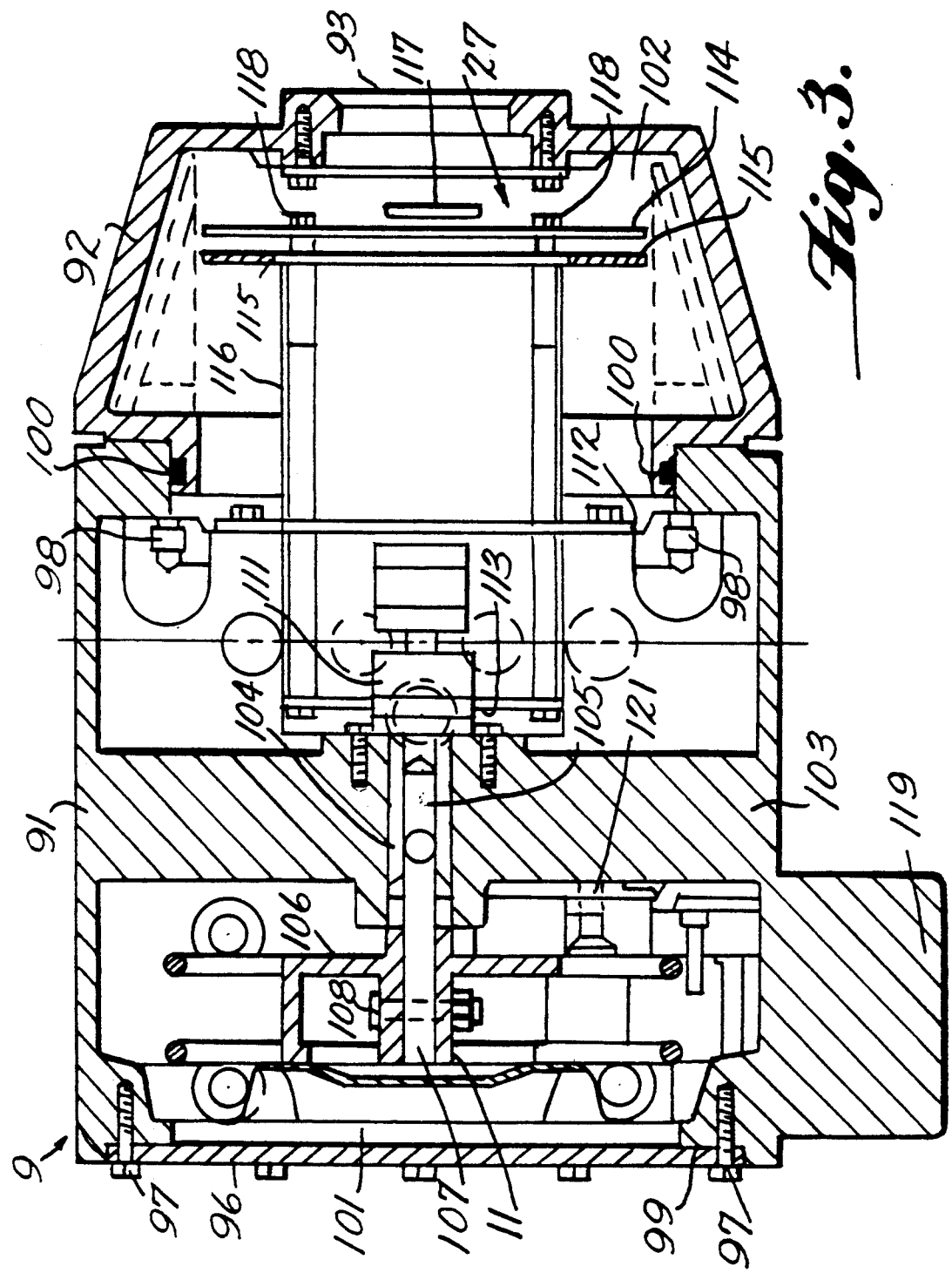

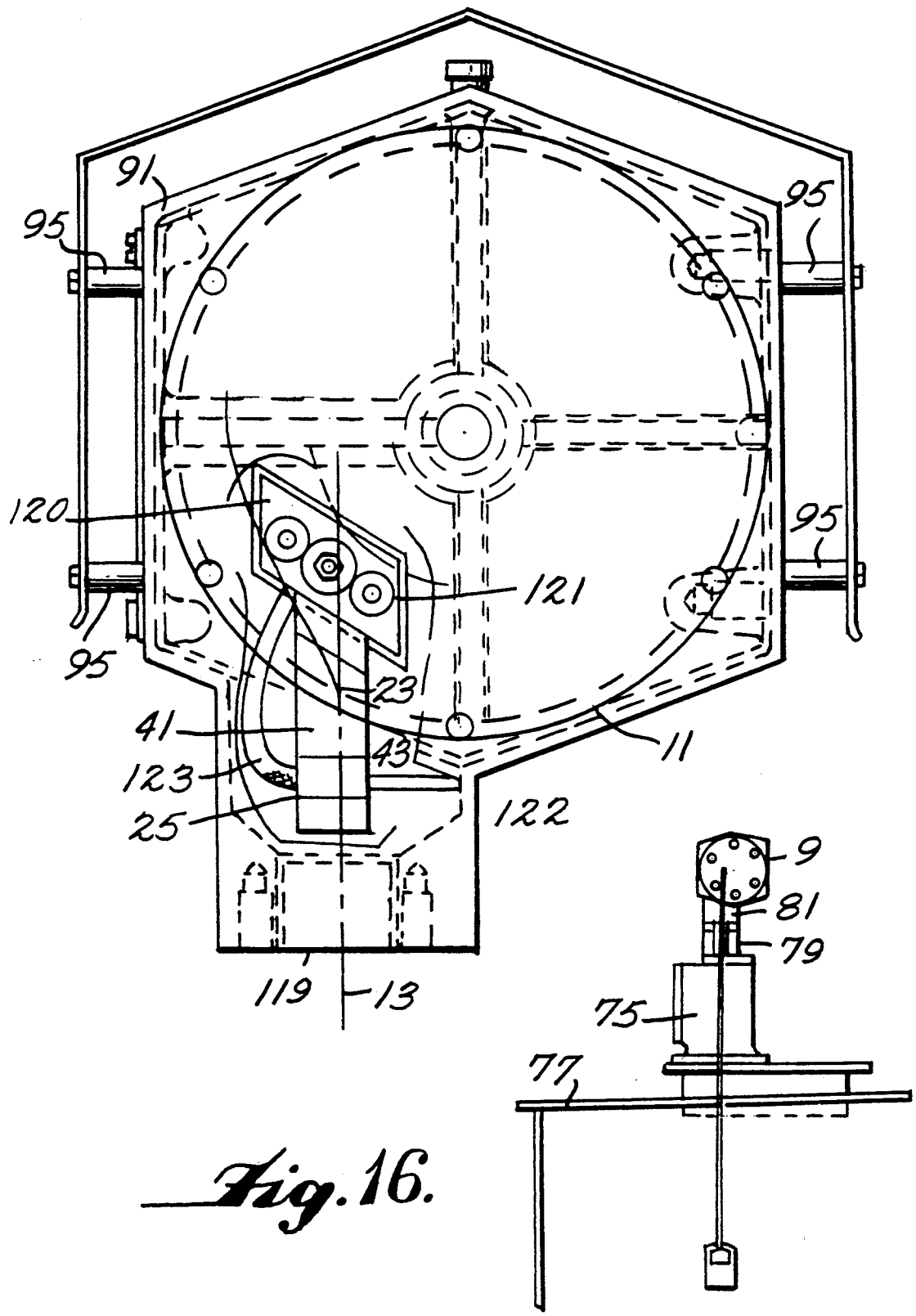

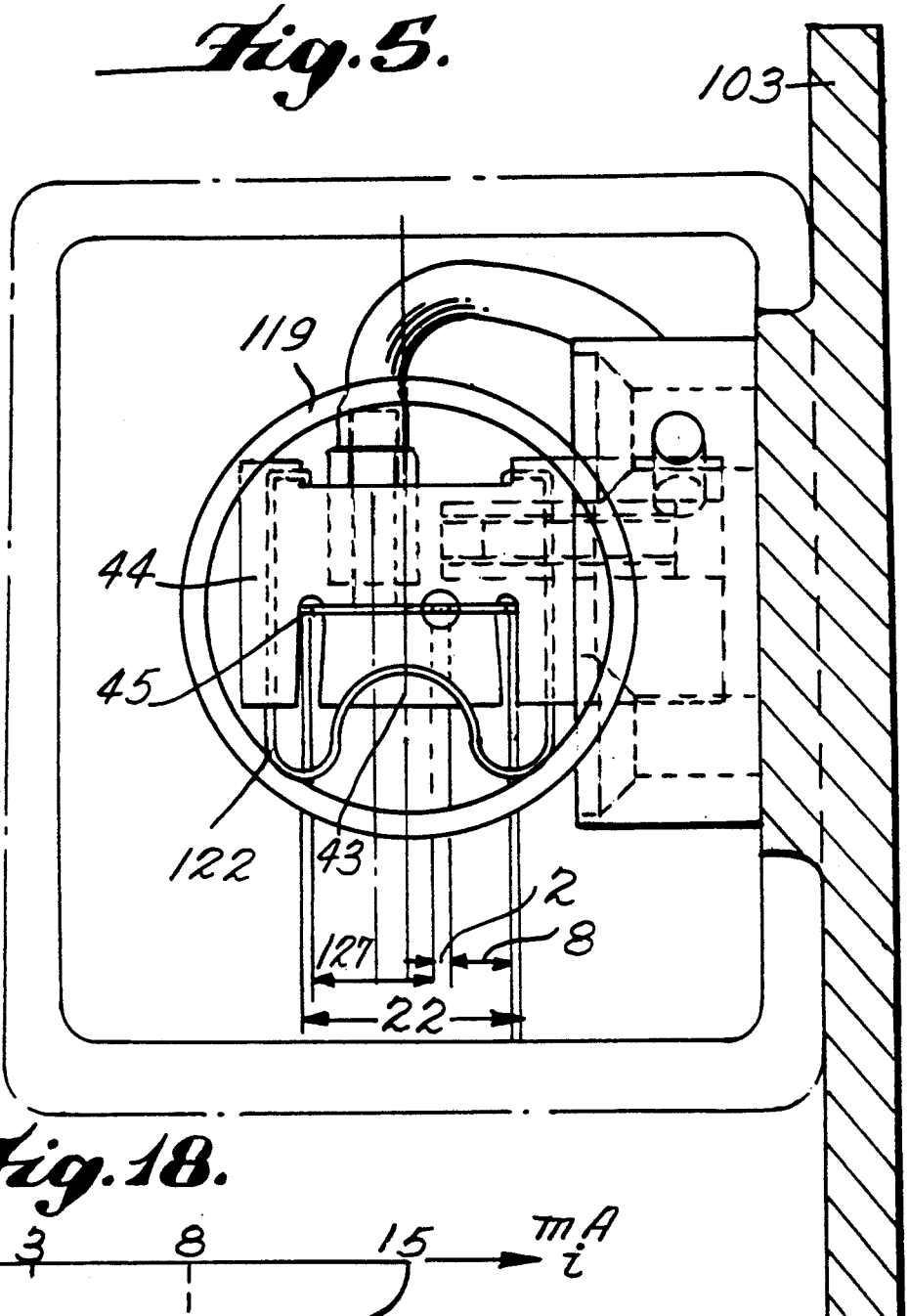
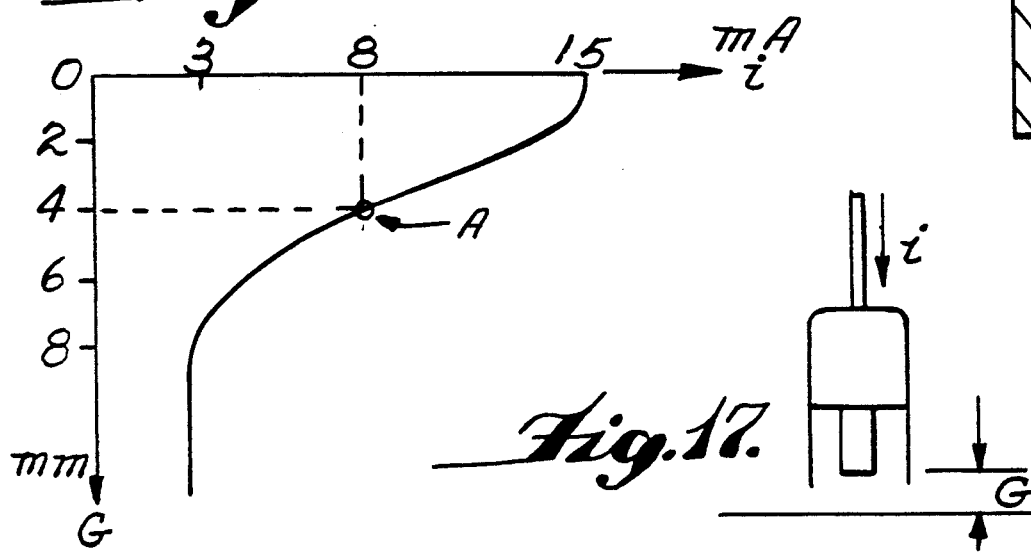

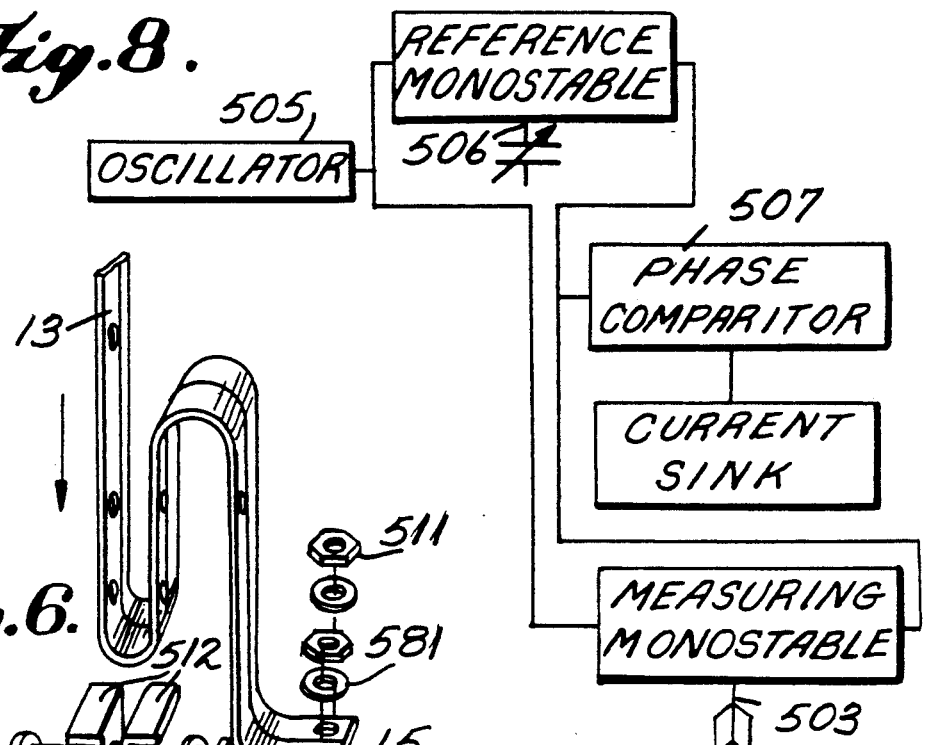
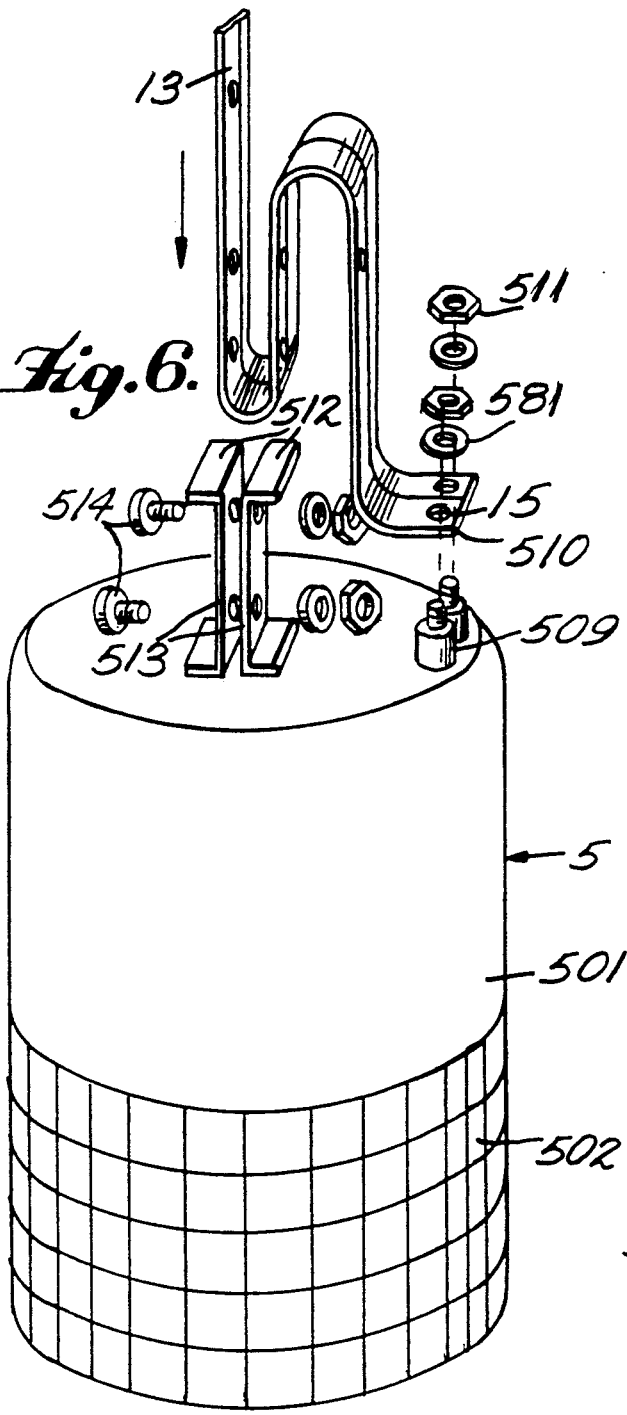
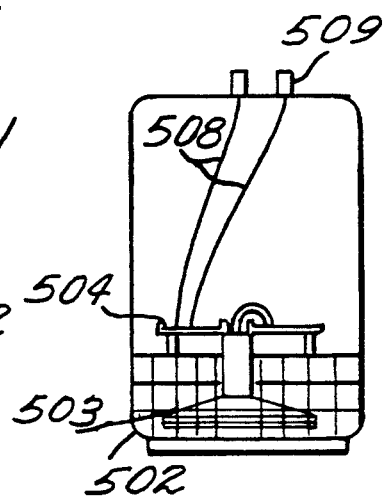

Fig. 20a. HOLE CENTER? UP
Fig. 20b. HOLE CENTER? DOWN

LIQUID LEVEL MEASUREMENT

FIELD OF THE INVENTION

The invention relates to apparatus for monitoring the level of a liquid within a vessel.

In a reservoir or storage tank, it is often vital to continuously monitor the level of a liquid within the tank. If the level were to change, this could mean a damaged tank or problems arising in the state of the liquid or liquids stored in the tank. For instance, if the liquids are volatile or flammable a small loss of liquid could result in major problems occurring. Thus it has been necessary to develop apparatus and systems for continuously and accurately monitoring the amount of liquid in the tank.

The invention is applicable to measurements of liquid level in a wide variety of vessels such as cone roofed tanks, floating tanks, underground or refrigerated tanks, high pressure tanks and and also to stilling wells. The liquid may range from crude to white oils, chemicals to liquified gas.

DESCRIPTION OF THE PRIOR ART

One type of measuring system which has been developed is one which comprises a surface following sensing head which in use sits within the tank and is arranged to follow the surface of the liquid as it rises or falls with the head being coupled to a gauging head typically mounted at a fixed distance above the vessel. The distance between the sensing head and gauging head is measured continuously. This distance is referred to as the ullage. From this can be calculated the level of the liquid with respect to the base of the vessel and thus the volume of liquid in the vessel. Typically the surface following sensing head is coupled to the gauging head by a length of flexible wire tape or cable which is unwound or reeled in from a cylinder or pulley to accommodate the movement of the sensing head with the amount of tape or cable extending from the cylinder or pulley representing the ullage. The present invention is concerned with the accurate measurement of the length of the flexible tape or cable as it is unwound and reeled in.

The sensing head may be in the form of a float which sits on the surface of the liquid. However, there has been developed a capacitive sensing head which is electrically connected to the gauging head such that when a capacitance is sensed which is indicative of no liquid the gauging head unwinds more flexible tape or cable to lower the level of the sensing head until the capacitive head sends a signal to the gauging head indicative of the presence of the liquid.

SUMMARY OF THE INVENTION

According to the invention, there is provided apparatus for monitoring the level of a liquid in a vessel, the apparatus comprising:

a surface following sensing head adapted to follow the surface of the liquid;

a gauging head; means for mounting the gauging head at a pre-determined fixed distance from the vessel;

a reel rotatably mounted within the gauging head;

a flexible elongate tape having two ends, one end being wound upon the reel and the other end being connected to the sensing head, the tape passing along a defined path of fixed length from the reel to a reference point above the vessel; the flexible tape including a plurality of level markers, the level markers being equally spaced one from another along the length of the tape, each pair of adjacent markers being a pre-determined fixed distance apart;

a stepper motor mounted within the gauging head and coupled to the reel to rotate the reel about its axis in two opposite directions;

a step counter coupled to the stepper motor to count the number of steps stepped by the motor and the direction in which the steps are taken;

a guide means mounted upon the gauging head including a marker detector through which the tape passes to detect the presence or absence of a marker;

a microprocessor mounted within the gauging head and coupled to the marker detector and the step counter to calculate and display the level of the liquid by calculating the ullage.

This calculation is carried out by multiplying the number of markers which lie between the sensing head and the marker detector by the pre-determined distance between the markers and adding to this the product of this distance and the number of steps moved by the motor divided by the number of steps the motor has moved between the last two markers to be detected. This gives an accurate calculation of the position of the sensing head given that it is independent of the diameter of the reel or how much tape has been unwound from the reel. The tape should be of substantially constant length in that it should be substantially inelastic and uneffected by temperature variations.

The gauging head may be mounted above the vessel, in which case the path followed by the tape is directly downwards into the vessel. Here the reference point may be the gauging head, or preferably the marker detector itself. In some cases however it is not possible to mount the gauging head above the vessel, and it has to be fixed for instance to an outer wall of the vessel. In this case the tape has to be constrained to follow a fixed path of fixed and known length to a reference point above the vessel. It is from this point that the ullage may be measured. Typically the tape follows guide wires to ensure it follows the correct path.

The surface following sensing head may be a float which floats on the surface of the liquid but preferably the head is in the form of a capacitive sensing head. The capacitive sensing head is typically one which hovers at a fixed distance above the liquid surface, and which includes a capacitive bridge. The electronics are static and accurately detect the slightest movements in level. A suitable capacitive sensing head is available from Whessoe SA of Rue de Bitche, 62100 Calais, France and is used in the 1140 Servo gauge. The capacitive sensing head has to be electrically connected to movement control means, mounted within the gauging head and coupled to the stepper motor. Typically the control means is controlled by the microprocessor.

Preferably in this case, the tape also includes an electrical conductor so that the capacitance sensed by the head is conducted through the tape to the control means within the gauging head to control the movement of the stepper motor to ensure that the sensing head does indeed follow the surface of the liquid.

In a preferred form of the invention, the tape is a perforated tape where the perforations act as the markers. Preferably the flexible tape is a stainless steel tape coated with PTFE.

Preferably the marker detector is in the form of an inductive sensor which senses the holes in the tape. Preferably in this case the inductive sensor is arranged to sense the center of each hole. By monitoring the current induced in the sensor by moving the tape first in one direction and then in the opposite direction, corrections may be made in the microprocessor control to eliminate any hysteresis error.

Typically the motor steps 4800 times per turn of the reel with one turn representing 300 to 520 millimeters of tape dependent upon whether the reel is storing 0 to 30 meters of tape. However, since the measurement of the level is made dependent upon only the number of steps between the last two holes to be detected, the apparatus will maintain its accuracy throughout the length of the tape irrespective of how much tape is stored on the reel.

Preferably the distance between two markers is 50 mm. Preferably the tape includes a set of auxiliary markers to give an absolute measurement of level, typically every meter. Typically such markers may be in the form of additional holes arranged a small distance from each meter marker. Preferably these additional holes are spaced at different distances from the meter markers to provide a clear indication of absolute position of the tape.

Preferably the microprocessor includes means to maintain accurate readings even during turbulence of the liquid. This is carried out by integrating variations of level and calculating an average.

Typically the apparatus is also arranged to measure other parameters of the liquid in the vessel. In such a case several other sensors such as temperature sensors, transducers or vapour pressure sensors are mounted in the vessel, and are coupled to the gauging head, controlled by the microprocessor.

BRIEF DESCRIPTION OF THE DRAWINGS

Apparatus in accordance with the invention will now be described by way of example only, with reference to the accompanying drawings, in which:

FIG. 3 is a section through the gauging head;

FIG. 4 is a section through section 3;

FIG. 5 is an underside view of the marker detector;

FIG. 6 is an exploded perspective view of the sensing head;

FIG. 7 is a schematic section through the sensing head;

FIG. 8 is a block circuit diagram of the sensing head;

FIG. 16 is a schematic view illustrating a method of mounting a gauging head on a tank;

FIG. 17 is a schematic view of a sensing head;

FIG. 18 is a graph of current against distance of head from liquid surface;

FIGS. 20, 20a, and 20b illustrate the method of overcoming hysteresis error.

DESCRIPTION OF THE PREFERRED EMBODIMENT

Appparatus generally referenced 1 is for monitoring the level of liquid in a vessel indicated schematically as 3. The apparatus comprises a surface following sensing head 5 adapted to follow the surface 7 of the liquid.

Figure 14:
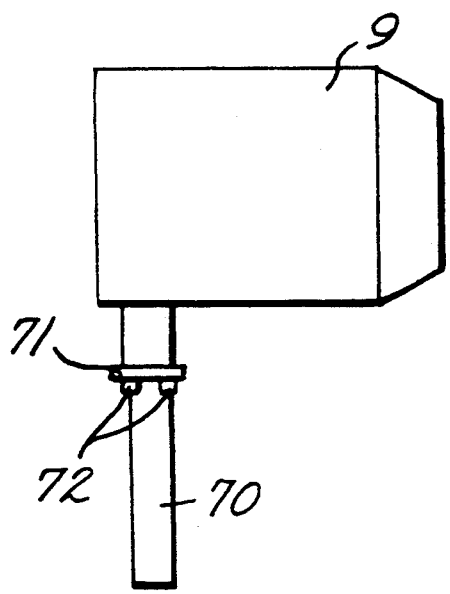
FIG. 14 is a schematic view illustrating a first method of mounting a gauging head on a stillwell.
Figure 15:
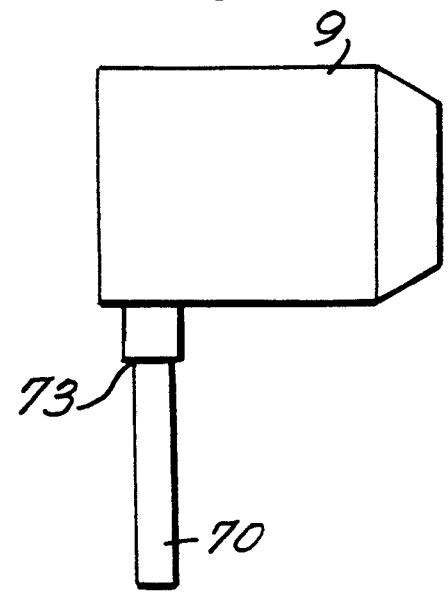
FIG. 15 is a schematic view illustrating a second method of mounting a gauging head on a stillwell.

A gauging head 9 is mounted outside the vessel 3 by mounting means illustrated in more detail in FIG. 14 to 16.

A reel 11 is rotatably mounted within the gauging head 9 and haw wound upon it flexible elongate tape 13 having its other end 15 connected to the sensing head 5.

The flexible tape 13 includes a plurality of level markers 17, the level markers being equally spaced one from another along the length of the tape 13, each pair of adjacent markers 17 being a pre-determined fixed distance apart.

A stepper motor 19 is mounted within the gauging head 9 and coupled to the reel 11 to rotate the reel 11 about its axis in two opposite directions. A step counter 21 is coupled to the stepping motor 19 to count the number of steps stepped by the motor 19 and the direction in which the steps are taken. A guide 23 has mounted within it a marker detector 25 through which the tape 13 passes to detect the presence or absence of a marker 17. A microprocessor indicated generally as 27 is mounted within the gauging head and coupled to the marker detector 25 and the step counter 21 to calculate and display the exact level of the liquid by calculating the ullage (U). The step counter 21 is an electronic counter which counts the mechanical steps of the motor.

The distance (d) between each pair of adjacent markers 17 is 50 millimetres. The calculation is carried out by multiplying the number of markers 17 which lie between the sensing head 15 and the marker detector 25 (N1) and multiplying this by 50. Added to this is the number of steps taken by the stepper motor 19 since the last marker passed the detector 25 (N2) divided by the number of steps moved by the motor 19 between the last two markers 17 (N3) multiplied by 50. This gives an accurate indication of the distance between marker detector 25 and sensing head 15 to give the ullage U and therefore a calculation of the distance L of the surface 7 from the base of the vessel 29.

The surface following sensing head 5 is a capacitive sensing head which does not have to contact the surface of the liquid. The sensing head is sold by Whessoe of Rue de Bitohe, 62100 Calais, France as part of their 1140 servo-gauge. The sensing head 5 is illustrated in more detail in FIGS. 6, 7 and 8 and its operation is illustrated schematically in FIGS. 17 and 18. FIG. 18 illustrates, in graphical form, the relationship between the distance G (mm.) of the sensing head 5 from the liquid on the vertical axis and the current (ma.) on the horizontal axis. The sensing head 5 comprises a cylindrical housing 501 part of which is in the form of a cylindrical cage 502. Mounted within cage 502 is the capacitor electrode plate 503 which is protected by the cage 502 which acts as a shroud. The capacitor electrode 503 is connected to circuit board 504 illustrated in FIG. 8. An oscillator 505 feeds a signal to the electrode 503 which produces a current signal which is compared to a reference capacitance from a variable capacitor 506 by phase comparitor 507. Power supply lines 508 connect the circuit board 504 to tape terminals 509. The end 15 of the tape 13 includes holes 510 which pass over the tape terminals 509 and are bolted in position by nuts 511 to maintain an electrical contact. For additional secure fastening of the tape 13 to the sensor head 5, two U-shaped brackets 512 each have two holes 513 which can be aligned to holes on the tape 13 and bolts 514 passed through the hole to secure the tape 13 into position. The capacitive head is a 3/16 mA sensor. Current i is passed down the tape 13 to the electrode. The current is dependent upon the distance G of the plate from the surface of the liquid. Here the preferred distance is 4 millimeters which is equivalent to a current of 8 mA ie position A at FIG. 18. If the current sensed is more than 8 mA, the capacitive electrode is too close to the liquid level and if less than 8 mA, it needs to be closer to the liquid level.

Figure 2A:
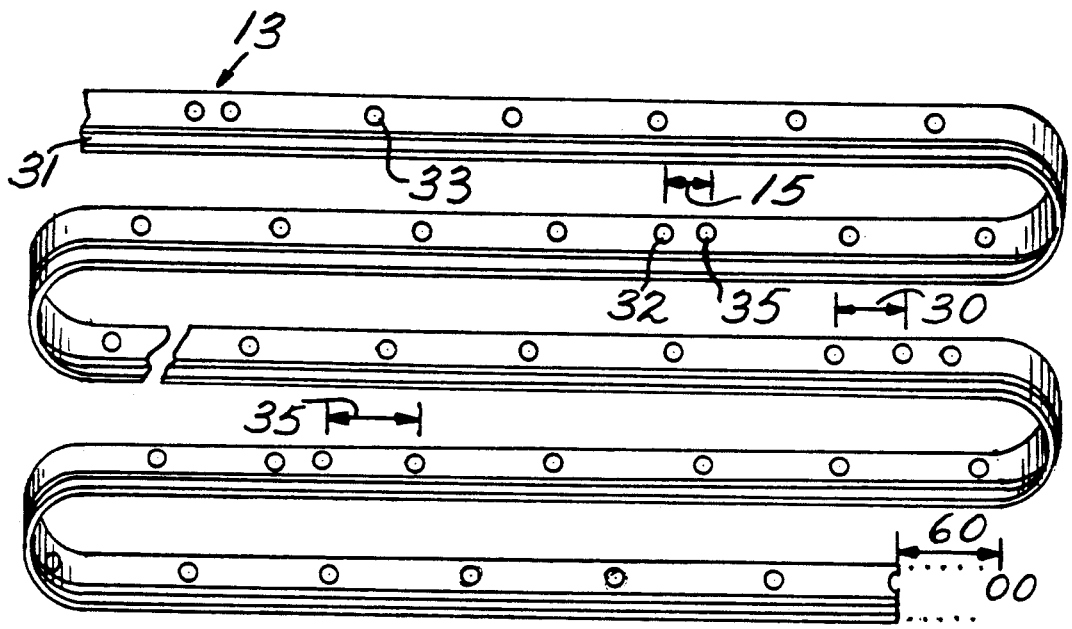
FIG. 2a, 2b and 2c are perspective views of the tape.
Figure 2B:
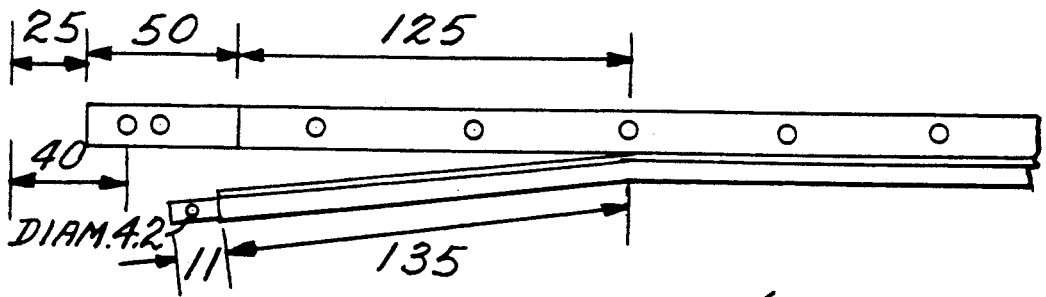
Figure 2C:
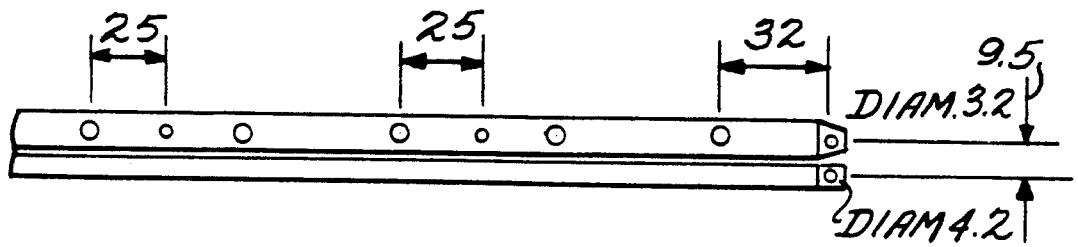

The sensing head 5 is electrically connected to the gauging head 9 by conductor 31 which forms part of the elongate tape 13 shown in more detail in FIGS. 2a, 2b and 2c. The conductor 31 is coupled to the microprocessor 27 which controls the stepper motor 19 to move the sensing head 5 to the level of the liquid when it detects movement in the liquid level by a change in capacitance.

The tape 13 is of stainless steel coated with PTFE (which here is that sold under the trade mark TEFZELT which is particularly durable. The length of the tape stored on reel 11 is 30 meters. It has a plurality of holes 33 punched along its length which serve as marker 17. The holes 33 are not circular but are ovals formed of two semicircles with radius 0.5 millimeter with square of 1 millimeter between.

The distance between the center of each pair of adjacent holes 33 is 50 millimeters.

The thickness of the tape is 0.5 millimetres. In order to provide an absolute measurement of the length of tape extending from the marker detector at any one time a set of auxiliary reference markers in the form of holes 37 are provided spaced from each meter marker 35. After the first meter marker an auxiliary hole is spaced 15 millimeters away; after the second there is an auxiliary hole 20 millimeters away, after the third 25 millimeters and so on until after the sixth meter or meter marker, there is an auxiliary hole 40 millimetres spaced therefrom. The seventh meter marker has an auxiliary marker 15 millimeters away. A table showing the different auxiliary markers for use with each meter marker 37 is shown in the table below.

|   |   |   |   |   | x |
|---|---|---|---|---|---|
| 1 or | 7 or | 13 or | 19 or | 25 | 15 mm |
| 2 | 8 | 14 | 20 | 26 | 20 mm |
| 3 | 9 | 15 | 21 | 27 | 25 mm |
| 4 | 10 | 16 | 22 | 28 | 30 mm |
| 5 | 11 | 17 | 23 | 29 | 35 mm |
| 6 | 12 | 18 | 24 | 30 | 40 mm |

This means that the absolute reference point is always measured to an absolute value of plus or minus six (6) meters. Fine tuning of this measurement is made by knowing the number of one meter holes already counted before reaching the hole which reflects the diameter of tape 13 stored on the reel 11.

The gauging head 9 is illustrated in detail in FIGS. 3 to 5. The gauging head 9 comprises the housing 91 of hexagonal cross section having a tapered end 92. The housing 91 is an enclosed steel body apart from glass window 93 through which a display can be seen of the level being measured. An aluminum solar protective cover 94 is mounted about the housing 91 by spacers 95. The housing 91 includes an end cover 96 which is bolted to the housing 91 by bolts 97. The tapered part of the housing 92 forms a separate element which is bolted to the rest of the housing by a set of bolts 98. In order to maintain a good seal between the housing 91 and cover 96 and 92 respectively, O rings 99 and 100 are used. The housing 91 defines broadly two chambers 101 and 102 with dividing member 103 defining the two chambers but including a cylindrical hole 104 through which shaft 105 passes to connect the two chambers 101 and 102.

Mounted within chamber 101 is reel 11 which comprises a polyamide hub 106 bolted to central shaft 107 by bolt 108. Shaft 107 passes through the central hole 105 in partition 103 and is mounted to rotate through bush 109 and bearing 110 the drive to the shaft being provided by stepper motor 19 via slip ring assembly 111. The stepper motor 19 operates via motor printed circuit board ("PCB") 112. A motor control PCB 113 instructs the stepper motor 19 to operate in a given direction. A microprocessor PCB 114 and peripheral power supply PCB 115 are coupled to the motor PCBs 112 and 113 via a vertical PCB 116. A display PCB 117 is controlled by the microprocessor PCB 114 to provide a display of the ullage and level of liquid. The PCBs are all connected by electrical connectors, not shown. Together PCBs 114, 115, 117 and 116 can be regarded as the microprocessor 27. Spacer rods 118 hold the circuit boards in the required position.

The stepper motor 19 is a standard bipolar stepper motor and the choice of an appropriate motor will be readily apparent to the skilled addressee of the specification. It steps 4800 times per turn of the reel 11. Each turn of the reel 11 represents the 300 to 520 millimeters of tape 13 dependent on whether the reel is storing 0 or 30 meters of tape. Thus one step of the motor represents approximately 0.1 millimeter of movement of the sensing head. However, the apparatus is arranged such that the calculation of level of the surface 7 is not dependent upon total number of steps moved by the stepper motor 19, only on a comparison of number of steps taken from the last hole 31 as against the number of steps taken between the last two holes—this reduces any error due to effective diameter of the reel (reel plus stored tape) to a negligible amount.

The step counter is formed by the motor control circuit board 113 coupled to the stepper motor 19.

The tape 13 enters the housing 91 through cylindrical opening 119. It passes through a guide 23 which has mounted within it an inductive sensor head 25.

The guide 23 is mounted on sensor support 120 which is mounted by bolts 121 to member 103. The guide 23 comprises two parts 41 and 43 between which is defined a slot 45 through which tape 13 passes. The two parts 41 and 43 are brought together by two spring clamps 122. The inductive sensor 25 is an inductive proximity switch comprising an oscillator, trigger and amplifier mounted within sensor head 25 which generates an electro-magnetic field of a radio frequency. The presence of a metallic target within that field causes eddy currents to be generated on the surface of the target. The oscillator is loaded by this generation and the oscillations are damped. The trigger detects this change and switches the output circuit via the amplifier. Thus, as can be seen in FIG. 5, as a hole in the tape passes the sensor head 25, the signal through the amplifier will be different from when no hole is present. The signal is fed via conductors surrounded by protective cover 123 to sensor support 121 and then through to the microprocessor 127.

Figure 20:
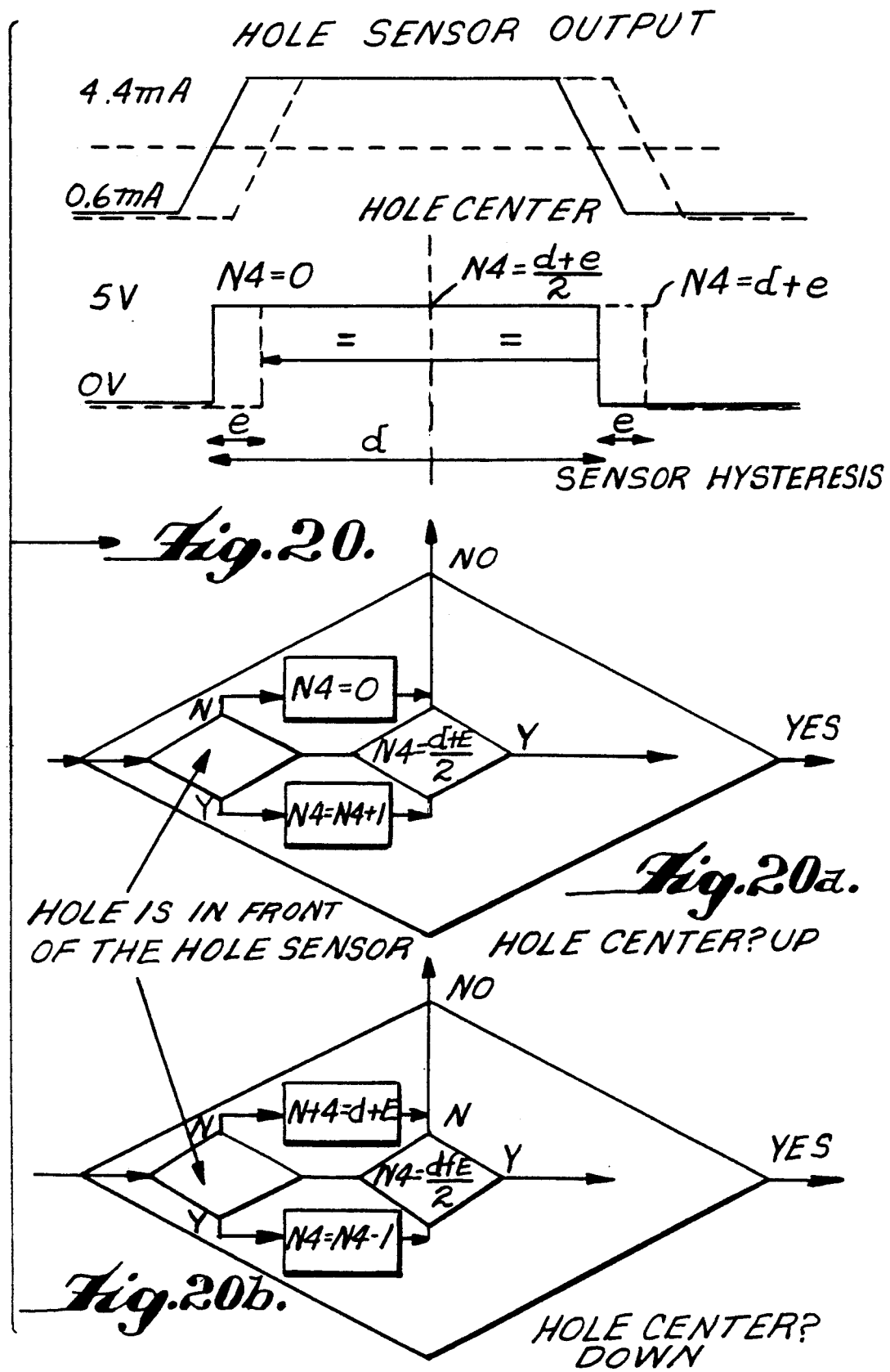

As a hole passes through the inductive sensor, the level of induced current changes as shown schematically in FIG. 20. This illustrates the current detected and voltage detected as the tape moves in two opposite directions. In order to eliminate hysteresis errors and as shown in the decision blocks of FIGS. 20a and 20b, the movement of the tape in two opposite directions is used to calculate error e and then microprocessor 27 is used to calculate the exact position of the hole center. Thus, throughout the level measurement, the hole center can be accurately detected. The inductive hole sensor 25 senses holes with an accuracy of + or −0.1 millimeteres. Any possible sensor drift is automatically compensated for by the microprocessor.

In order to eliminate any errors caused by surface turbulence and integration that takes place, an average value of the instantaneous surface level 7 are calculated. The system is programmable to change the time over which an integration takes place. This can be from 0.2 to 30 seconds but typically will be 2 seconds. During the set time period, 128 samples are taken and an average value is produced. If the average value changes then the sensor head 5 will move. Changes in level translated by the sensing head 5 into variations of current are measured by the microprocessor 27 mounted within flameproof compartment 102 in the gauge head 9. The electronics within the gauge head have a number of purposes. The electronics power the sensing head 5 and detect variations in current from sensing head 5 which determines the direction of motor rotation of motor 19 and adjust the speed of the motor 19 proportional to the gap between the sensor head 5 and the liquid level 7. The surface turbulence is then integrated. The steps made by the motor 19 are counted and deducted by the microprocessor 27. The number of tape holes 17 which have passed the detector 25 are counted and deducted and the sensing head is maintained at liquid level.

The measurement of the level is given by a formula:

$$L = H - \left(N_1 + \frac{N_2}{N_3}\right) 50 \text{ mm}$$

where:
H = the reference point outside the gauge
N1 = the number of perforations outside the gauge
N2 = the number of steps made by the motor since the last hole
N3 = the number of steps between the last two holes.

Figure 19:
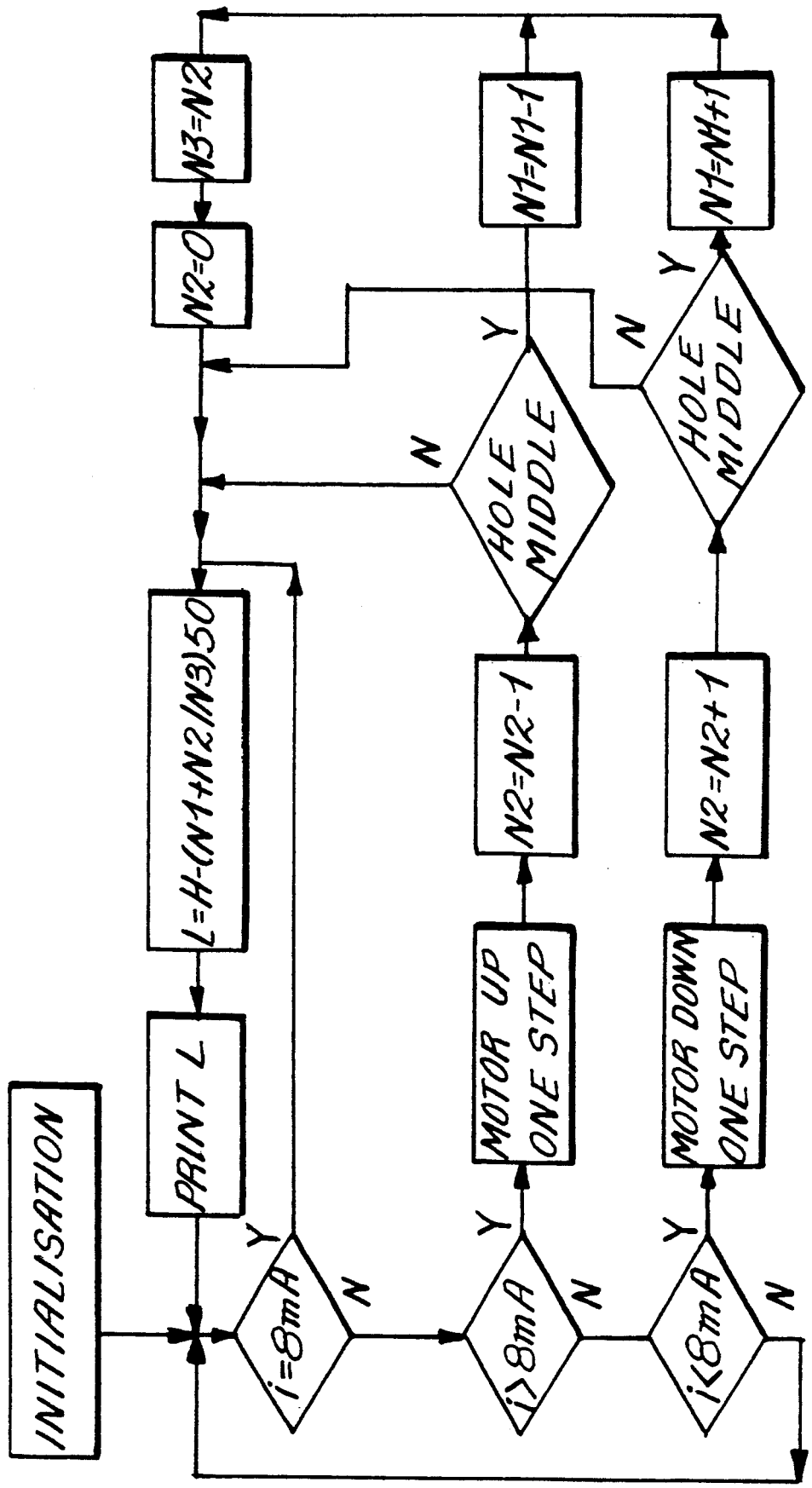
FIG. 19 is a block diagram illustrating how depth of liquid is calculated.

The block diagram forming FIG. 19 illustrates the continuous updating of the position calculated dependent on the current fed from sensing head 5, and the movement of the stepper motor 19. As shown, the control branches to one of three pathways as a function of the sensed current, i.e., if the current (i) is equal to 8 ma., greater than 8 ma., or, less than 8 ma.

The display PCB displays a figure indicative of the depth of the liquid within vessel 3. The window 93 allows the information to be read easily.

The power to the gauging head 9 is controlled by peripheral PCB 115.

Figure 9:
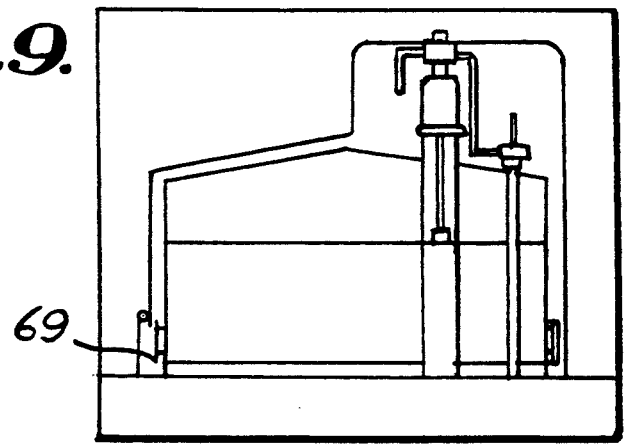
FIG. 9 is a schematic section through a tank illustrating the apparatus in its in use position.
Figure 10:
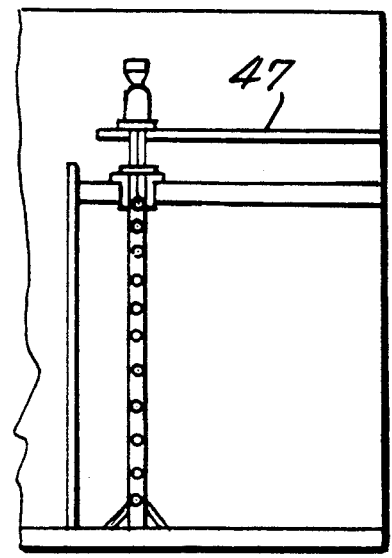
FIG. 10 is a schematic section through a floating roof tank incorporating the apparatus.
Figure 11:
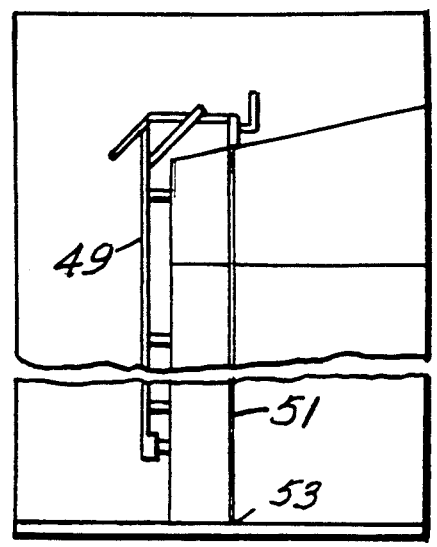
FIG. 11 is a schematic section through a cone roof tank incorporating the apparatus.
Figure 12:
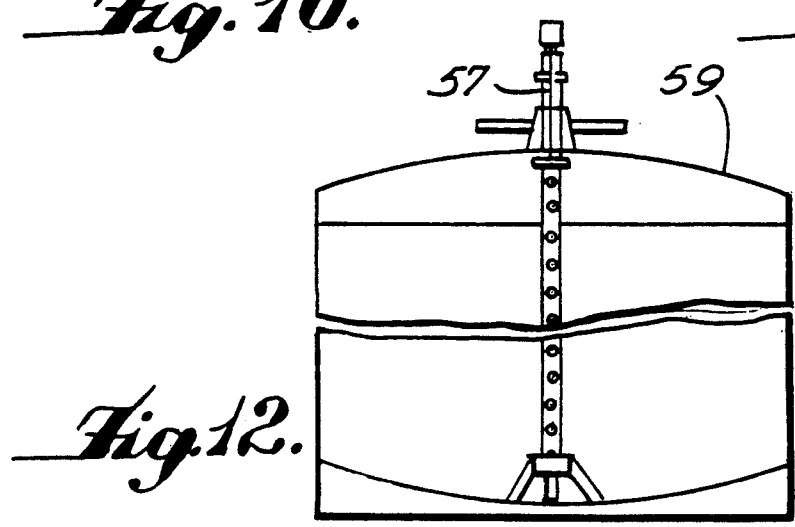
FIG. 12 is a schematic section through a spherical tank incorporating a stillwell.

As shown in FIGS. 9 to 13, the apparatus can be used in a number of different circumstances. In FIG. 9 the apparatus is shown mounted above a tank. In FIG. 10 the apparatus is arranged such that the gauging head is mounted upon a gauger's platform 47 for use on a floating roof tank. In FIG. 11 the apparatus is for use with a cone roof tank where the gauging head is not mounted above the vessel but is mounted on the wall of the vessel. The tape 13 passes along a path 49 of fixed length which has to be accounted for in the calculations relating to the level of the liquid. Here the sensor head is maintained along the correct path by guide wires 51 which are anchored to the base of the vessel by an anchor bar 53. In FIG. 12 the apparatus is used as a high pressure gauge on a sphere where the liquid level to be monitored is in a stillwell 55. Here the tape 13 passes through an isolation valve 57 to maintain the pressure within the sphere.

Figure 13:
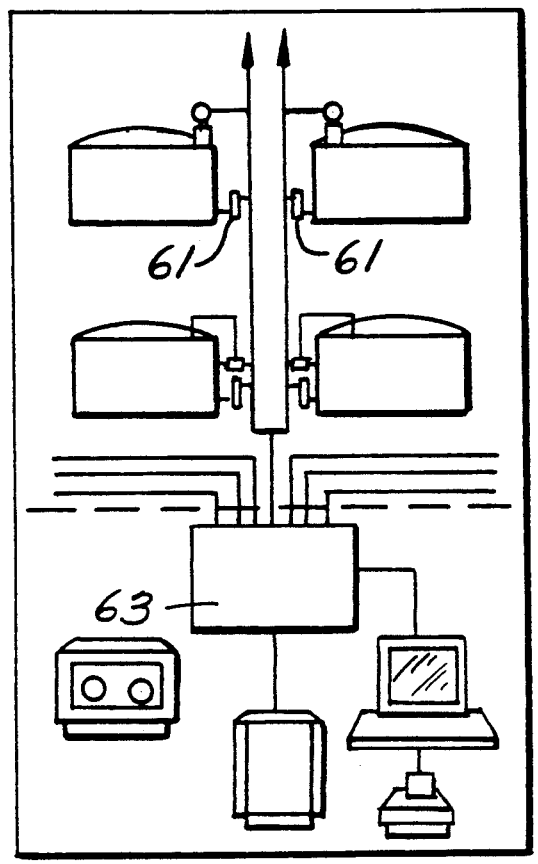
FIG. 13 is a schematic view of a plurality of apparatus in accordance with the invention incorporated into an integrated system.

As illustrated in FIG. 13 the apparatus may be used as part of an integrated system incorporating a number of gauging heads. The system shown in FIG. 13 incorporates a valve control system where each tank also includes valves 61 for feeding further liquid into a tank should the level of liquid within the tank fall below an acceptable level. The level within each tank is controlled by a remote microprocessor 63 in a control room.

Figure 1:
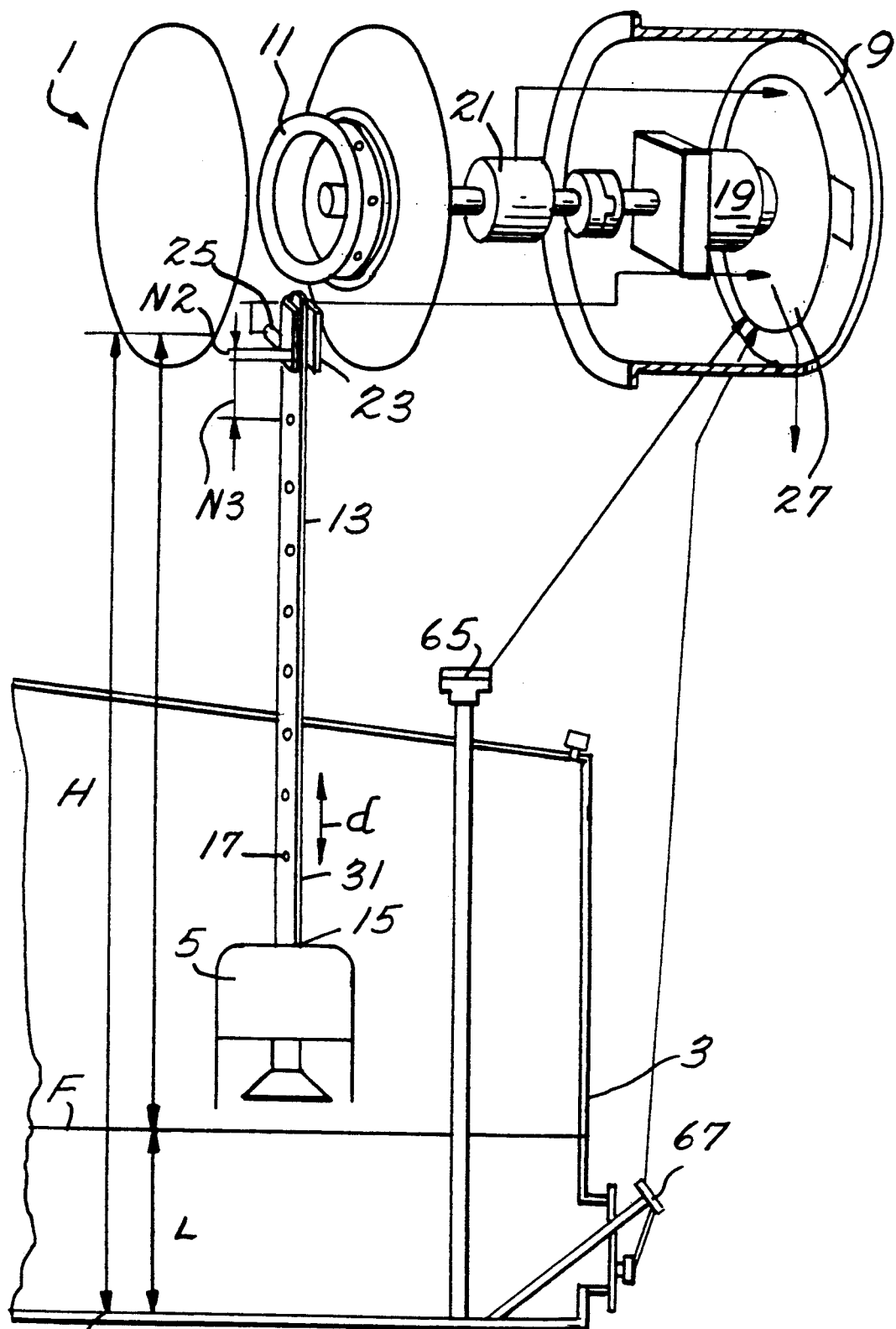
FIG. 1 is an exploded schematic view of the apparatus.

Although the apparatus has as its primary object the monitoring of the level of liquid within a vessel, the apparatus can also include means for measuring a number of other parameters. In the examples shown in FIG. 1 also mounted within the vessel is a temperature sensor 65. density sensor 67, both of which are coupled to microprocessor 27 to give read out of the temperature and density of the liquid at any one time. Such information will also be displayed by display PCB 117.

The apparatus shown in FIG. 9 also includes a sensor 69 for measuring base sediment and water measurement. It is also possible to measure the vapour pressure within the vessel.

The method of mounting the gauging head 9 is illustrated in further detail in FIGS. 14 to 16. FIGS. 14 and 15 illustrate two different methods of mounting the gauging head 9 upon a still well pipe 70. In a first method, the head 9 is mounted via mounting flange 71 to the still well 70 via mounting bolts 72. In a second method, the gauging head 9 is mounted via threaded collar 73.

In the apparatus shown in FIG. 16, the gauging head 9 is mounted upon inspection head 75 mounted on the flat roof of a tank 77. Mounted upon inspection hatch 75 is a flange stool 79 to which the head 9 is bolted via four bolts 81, the positions of which are shown by bores 82 in FIG. 3.

I claim:
1. Apparatus for monitoring the level of a liquid in a vessel, the apparatus comprising:
  a surface following sensing head adapted to follow the surface of the liquid;

a gauging head; means for mounting the gauging head at a pre-determined fixed distance from the vessel;

a reel rotably mounted within the gauging head;

a flexible elongate tape having two ends, one end being wound upon the reel and the other end being connected to the sensing head, the tape passing along a defined path of fixed length from the reel to a reference point above the vessel; the flexible tape including a plurality of level markers, the level markers being equally spaced one from another along the length of the tape, each pair of adjacent markers being a pre-determined fixed distance apart;

a stepper motor mounted within the gauging head and coupled to the reel to rotate the reel about its axis in two opposite directions;

a step counter coupled to the stepper motor to count the number of steps stepped by the motor and the direction in which the steps are taken;

a guide means mounted upon the gauging head including a marker detector through which the tape passes to detect the presence or absences of a marker; and, a microprocessor mounted within the gauging head and coupled to the marker detector and the step counter to calculate and display the level of the liquid by calculating the ullage.

2. The apparatus of claim 1, wherein the gauging head is mounted above the vessel so that the path followed by the tape is directly downwards into the vessel.

3. The apparatus of claim 1, wherein the vessel includes at least one outer side wall, and which the gauging head is mounted upon said side wall and the tape is constrained to follow a fixed path of fixed and known length to said reference point above the vessel.

4. The apparatus of claim 3, wherein the apparatus includes guide defining the path of the tape and the tape following the guide wires to ensure it follows the correct path.

5. The apparatus of claim 1, wherein the surface following sensing head comprises a float which floats on the surface of the liquid.

6. The apparatus of claim 1, wherein the surface following sensing head comprises a capacitive sensing head.

7. The apparatus of claim 6, wherein the capacitive sensing head includes a capacitive bridge, and in which the apparatus further comprises movement control means mounted within the gauging head and coupled to the stepper motor and connection means electrically connecting the capacitive sensing head to the movement control means.

8. The apparatus of claim 7, wherein the tape includes an electrical conductor which comprises the connection means between the capacitive sensing means and the movement control means.

9. The apparatus of claim 1, wherein the tape comprises a perforate tape where the holes comprise the markers.

10. The apparatus of claim 9, wherein the tape is a stainless steel tape coated with PTFE.

11. The apparatus of claim 9, wherein the marker detector comprises an inductive sensor which senses the holes in the tape.

12. The apparatus of claim 11, wherein the inductive sensor is arranged to sense the center of each hole.

13. The apparatus of claim 1, wherein the distance between two adjacent markers is substantially 50 mm.

14. The apparatus of claim 1, wherein the tape includes a plurality of auxiliary markers to provide an absolute measurement of level.

15. The apparatus of claim 14, wherein said tape is perforate with level markers comprising holes in the tape, and said auxiliary markers also comprise holes in the tape, the level markers include a series of meter level markers, each marking a distance of one meter and each auxiliary marker being a small distance from a meter level marker.

16. The apparatus of claim 15, wherein successive auxiliary markers are spaced at different distances from their adjacent level marker.

17. The apparatus of claim 1, wherein the microprocessor includes means to maintain accurate readings during turbulence of the liquid in the vessel.

18. The apparatus of claim 1, also comprising at least one of a temperature sensor, a transducer and vapour pressure sensor mounted within the vessel and coupled to the gauging head and controlled by the microprocessor.

* * * * *